US009585511B2

(12) United States Patent
Koeling et al.

(10) Patent No.: US 9,585,511 B2
(45) Date of Patent: Mar. 7, 2017

(54) SYSTEM FOR PREPARING PORTIONS OF A BEVERAGE SUITABLE FOR CONSUMPTION

(75) Inventors: Hendrik Cornelis Koeling, Amers Foort (NL); Gustaaf Frans Brouwer, Nijkerk (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 2133 days.

(21) Appl. No.: 11/629,838

(22) PCT Filed: Jun. 17, 2005

(86) PCT No.: PCT/NL2005/000444
§ 371 (c)(1),
(2), (4) Date: Dec. 17, 2007

(87) PCT Pub. No.: WO2005/122851
PCT Pub. Date: Dec. 29, 2005

(65) Prior Publication Data
US 2008/0105130 A1 May 8, 2008

(30) Foreign Application Priority Data
Jun. 17, 2004 (NL) ..................................... 1026437

(51) Int. Cl.
*A47J 31/40* (2006.01)
*A47J 31/44* (2006.01)
(Continued)

(52) U.S. Cl.
CPC ............ *A47J 31/407* (2013.01); *A47J 31/40* (2013.01); *A47J 31/4492* (2013.01);
(Continued)

(58) Field of Classification Search
USPC .................. 99/279, 280, 282, 283, 295, 300
See application file for complete search history.

(56) References Cited

U.S. PATENT DOCUMENTS

| 2,968,560 A | 1/1961 | Goros |
| 3,425,339 A | 2/1969 | Fleischman et al. |

(Continued)

FOREIGN PATENT DOCUMENTS

| EP | 0209937 B1 | 6/1990 |
| EP | 0756844 B1 | 6/1999 |

(Continued)

OTHER PUBLICATIONS

"Douwe EUGHberts Don't Buy This." Douwe Egberts Instant Mocha Cofe—Product Information, Ciao! From bing™, http://www.ciao.co.uk/Douwe_Egberts_Instant_Mocha_Coffee_Review__5355952, Oct. 1, 2002.

(Continued)

*Primary Examiner* — John E Simms, Jr.
(74) *Attorney, Agent, or Firm* — Foley & Lardner LLP

(57) ABSTRACT

A system for preparing portions of a beverage suitable for consumption, comprising an apparatus for preparing the beverage and a closed and form-retaining holder removably received in the holder, which holder is at least filled with a product to be dissolved and/or to be diluted such as a concentrate. The apparatus is provided with a liquid device for dispensing under pressure a fluid comprising a liquid such as water and, optionally, a gas such as steam or air, a receiving space in which the holder is received and at least one probe provided with at least one channel which, on the one side, is in fluid communication with the liquid device and which, on the other side, terminates in at least one outflow opening of the probe. The apparatus is designed for puncturing the wall on a first side and for moving the probe and the holder relative to each other such that the probe, in use, can be inserted through the first side of the holder whereupon the at least one outflow opening reaches into the holder.

34 Claims, 6 Drawing Sheets

(51) Int. Cl.
  *B67D 1/00* (2006.01)
  *B67D 1/12* (2006.01)
  *B67D 1/08* (2006.01)
(52) U.S. Cl.
  CPC ......... *B67D 1/0021* (2013.01); *B67D 1/0044* (2013.01); *B67D 1/0078* (2013.01); *B67D 1/1272* (2013.01); *B67D 2001/0812* (2013.01)

(56) References Cited

U.S. PATENT DOCUMENTS

| | | | |
|---|---|---|---|
| 3,587,444 A | 6/1971 | Godel | |
| 3,952,641 A * | 4/1976 | Vitous | 99/295 |
| 3,971,088 A * | 7/1976 | Osiadacz | 99/533 |
| 4,147,097 A | 4/1979 | Gregg | |
| 4,158,067 A | 6/1979 | Wouda | |
| 4,353,293 A * | 10/1982 | Illy | 99/283 |
| 4,518,105 A | 5/1985 | Kuckens et al. | |
| 4,715,274 A | 12/1987 | Paoletti | |
| 4,718,579 A | 1/1988 | Brody et al. | |
| 4,791,860 A | 12/1988 | Verheijen | |
| 4,909,136 A * | 3/1990 | Newman et al. | 99/289 R |
| 5,014,611 A | 5/1991 | Illy et al. | |
| 5,242,702 A | 9/1993 | Fond | |
| 5,398,596 A * | 3/1995 | Fond | 99/295 |
| 5,402,707 A * | 4/1995 | Fond et al. | 99/295 |
| 5,472,719 A * | 12/1995 | Favre | 426/77 |
| 5,598,764 A * | 2/1997 | Bambi | 99/295 |
| 5,638,740 A * | 6/1997 | Cai | 99/295 |
| 5,724,883 A | 3/1998 | Usherovich | |
| 5,762,987 A * | 6/1998 | Fond et al. | 426/433 |
| 5,842,603 A | 12/1998 | Schroeder et al. | |
| 5,882,716 A | 3/1999 | Munz-Schaerer et al. | |
| 5,895,672 A | 4/1999 | Cooper | |
| 6,019,032 A | 2/2000 | Arksey | |
| 6,021,705 A | 2/2000 | Dijs | |
| 6,035,762 A * | 3/2000 | Ruckstuhl | 99/295 |
| 6,079,315 A | 6/2000 | Beaulieu et al. | |
| 6,082,245 A | 7/2000 | Nicolai | |
| 6,142,063 A * | 11/2000 | Beaulieu et al. | 99/283 |
| 6,148,717 A * | 11/2000 | Lassota | 99/283 |
| 6,460,735 B1 | 10/2002 | Greenwald et al. | |
| 6,499,389 B1 | 12/2002 | Probst | |
| 6,764,704 B2 | 7/2004 | Schub | |
| 6,769,352 B2 * | 8/2004 | de Bruin et al. | 99/323.1 |
| 6,772,676 B2 * | 8/2004 | Lassota | 99/283 |
| 6,786,134 B2 * | 9/2004 | Green | 99/289 P |
| 7,093,533 B2 | 8/2006 | Tebo, Jr. et al. | |
| 7,325,479 B2 * | 2/2008 | Laigneau et al. | 99/295 |
| 7,350,457 B2 | 4/2008 | Wessels et al. | |
| 7,444,924 B2 * | 11/2008 | Laigneau et al. | 99/280 |
| 7,650,831 B2 * | 1/2010 | Denisart et al. | 99/283 |
| 7,748,311 B2 * | 7/2010 | Brouwer et al. | 99/295 |
| 2002/0029694 A1 * | 3/2002 | Wong | 99/280 |
| 2002/0088807 A1 | 7/2002 | Perkovic et al. | |
| 2003/0070554 A1 * | 4/2003 | Cortese | 99/279 |
| 2004/0005384 A1 | 1/2004 | Cai | |
| 2004/0074394 A1 * | 4/2004 | Small et al. | 99/275 |
| 2004/0194629 A1 * | 10/2004 | Jones et al. | 99/275 |
| 2005/0076784 A1 | 4/2005 | Tebo, Jr. et al. | |
| 2005/0223904 A1 * | 10/2005 | Laigneau et al. | 99/295 |
| 2006/0048650 A1 * | 3/2006 | Laigneau et al. | 99/323.3 |
| 2007/0137493 A1 * | 6/2007 | Van Der Meer et al. | 99/279 |
| 2007/0151466 A1 * | 7/2007 | Clark et al. | 99/467 |
| 2008/0105130 A1 | 5/2008 | Koeling et al. | |
| 2008/0148958 A1 | 6/2008 | Koeling et al. | |
| 2009/0272274 A1 * | 11/2009 | De Graaff et al. | 99/279 |

FOREIGN PATENT DOCUMENTS

| | | |
|---|---|---|
| EP | 1101430 A1 | 5/2001 |
| EP | 1510160 | 3/2005 |
| EP | 1848310 B1 | 11/2009 |
| FR | 2842090 | 7/2002 |
| FR | 2842092 | 1/2004 |
| JP | 61-245828 | 1/1986 |
| JP | 62-268513 | 11/1987 |
| JP | 2004696 A | 1/1990 |
| JP | 5151449 | 6/1993 |
| JP | 3029960 U | 10/1996 |
| JP | 10222748 | 8/1998 |
| JP | 200409171 A | 1/2004 |
| JP | 2004-528143 | 9/2004 |
| NL | 1020833 | 12/2003 |
| WO | WO 96/36557 | 5/1996 |
| WO | WO 96/36557 | 11/1996 |
| WO | WO 00/32291 | 6/2000 |
| WO | PCT/US01/31348 * | 4/2002 ............ A47J 31/00 |
| WO | WO 02/28241 A1 | 4/2002 |
| WO | WO 2005/105609 A2 | 11/2005 |
| WO | WO 2005/105609 A3 | 11/2005 |
| WO | WO 2005/122851 A1 | 12/2005 |
| WO | WO 2006/003565 A1 | 1/2006 |
| WO | WO 2006/043808 A2 | 4/2006 |
| WO | WO 2006/043808 A3 | 4/2006 |

OTHER PUBLICATIONS

Notice of Opposition to a European Patent for European Patent No. 1 848 310, filed Aug. 17, 2011.

\* cited by examiner

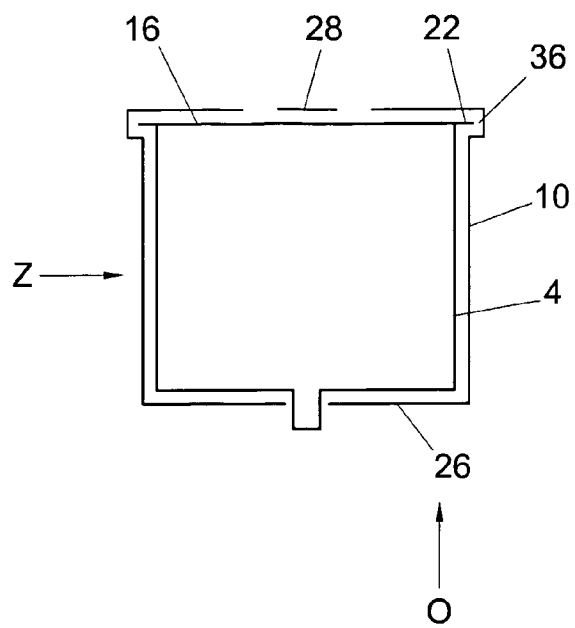
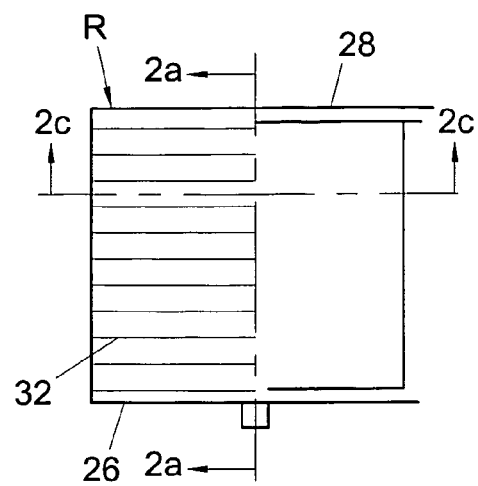
FIG. 2a    FIG. 2b
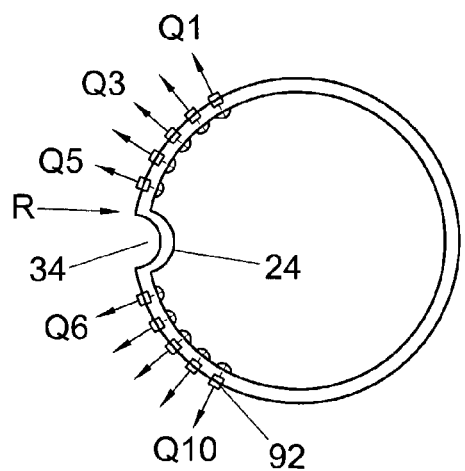
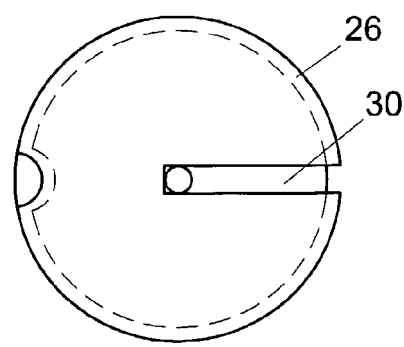
FIG. 2c    FIG. 2d

SYSTEM FOR PREPARING PORTIONS OF A BEVERAGE SUITABLE FOR CONSUMPTION

The invention relates to a system for preparing portions of a beverage suitable for consumption, comprising an apparatus for preparing the beverage and a closed and form-retaining holder removably received in the apparatus, which holder is at least filled with a product to be dissolved and/or diluted such as a concentrate, the apparatus being provided with a liquid device for dispensing a fluid under pressure, comprising at least one liquid such as water and, optionally, a gas such as steam or air, a receiving space in which the holder is received and at least one probe provided with at least one channel which, on the one side, is in fluid communication with the liquid device and which, on the other side, terminates in at least one outflow opening of the probe, a wall of the holder being manufactured from a fluid-tight material such as a plastic and/or a metal, while, on a first side of the holder, the wall is manufactured such that it can be punctured, the apparatus being designed for puncturing the wall on the first side and for moving the probe and the holder relative to each other so that in use, the probe can pierce through the first side of the holder, whereupon the at least one outflow opening reaches into the holder, the system being further provided with opening means for obtaining, in use, an outlet opening at the holder for dispensing the ready beverage while, in use, the fluid is supplied by the liquid device to the at least one channel for generating at least one jet of the fluid from the at least one outflow opening of the probe in the holder for dissolving and/or diluting the product whereupon the ready beverage flows from the at least one outlet opening.

Such a system is known per se from U.S. Pat. No. 6,079,315.

Here, the product to be dissolved and/or to be diluted can consist of a coffee concentrate for preparing coffee. An important advantage of such a system is that the holders are manufactured from a fluid-tight and form-retaining material. In this example, fluid-tight implies that liquid and air cannot flow or diffuse through a wall of the holder. This has as important advantage that the content of the holder remains fresh until the holder is placed in the apparatus and, on the one side, is opened for receiving the probe and, on the other side, is opened for dispensing the ready beverage via the outlet opening. Consequently, the ready beverage itself will also be completely fresh. The form-retaining character of the holder has as an advantage that it is easy to handle for a user. A drawback of the known system is that the characteristic properties of the ready beverage can only be modified by modifying the product to be dissolved itself. As a result, the system is limited in its use and, moreover, it is not always possible to obtain ready beverage which, depending on the type of beverage, can be completely optimized in conformity with the desires of a user. If the concentrate involves, for instance, a lemonade concentrate, it is preferred that the ready lemonade beverage has hardly any or no froth. If, however, the concentrate involves coffee concentrate, it may be preferred, depending on the desire of the user, that the ready coffee beverage is provided with a layer of froth.

It is an object of the invention to meet inter alia the above-mentioned limitation.

Accordingly, the invention is characterized in that the apparatus further comprises control means, while the apparatus is further designed to set, under control of the control means, at least one setting of the jet in a predetermined manner, as desired from a plurality of setting possibilities, for determining, in advance, characteristic properties of the ready beverage such as, for instance, the amount of froth that is obtained with the ready beverage through impact of the jet on an inside of the holder and/or on the product and/or on the fluid previously supplied to the holder, the at least one setting of the jet comprising the direction of the at least one jet, the position of the at least one jet, the flow rate of the at least one jet, the flow velocity of the at least one jet and/or the number of jets.

As the apparatus can set, i.e. can vary, under control of the control means, at least one of the above-mentioned settings at wish from a plurality of setting possibilities, presently, in a predetermined manner, specific characteristic properties of the beverage can be determined while here, specifically, properties of the beverage are involved which not only depend on the product to the dissolved and/or to be diluted as such. In case the product involves a lemonade, it can be arranged such that the jet strikes on a sidewall of the holder at an angle which deviates strongly from a normal of the sidewall at the location the jet strikes. As a result, little or no froth will be formed in the ready beverage. If, by contrast, it is intended that froth is formed, the jet can strike on a sidewall of the holder for instance at least virtually perpendicularly, or it can be provided that the jet strikes on an amount of ready beverage which is already present in the holder and which has not yet drained from the holder via the outlet opening. It is also conceivable that the amount of froth be varied by varying the flow velocity of the at least one jet and/or the flow rate of the at least one jet. Also, the number of jets can be varied for varying the characteristic properties of the beverage. As, after use, the form-retaining holder can be replaced with a new holder, contamination can be prevented. This holds in particular when, in use, the at least one probe does not directly contact the product, i.e. does not reach into the product. More particularly, it holds that the apparatus is designed to set, under control of the control means, the position of the probe within the holder at wish from a plurality of setting possibilities, for setting the direction of the at least one jet in the predetermined manner. It is also possible that the probe is provided with at least one second outflow opening, while the apparatus is designed to generate, under controlling the control means, in a settable manner with the aid of the first outflow opening, a first flow of the fluid in the holder and/or to generate, with the aid of the second outflow opening, a second jet of the fluid. More particularly, it holds here that the probe is designed to close off or release, under control of the control means, the first outflow opening in a settable manner and to close off or release the second outflow opening in a settable manner. However, it may also hold that the probe is provided with a first channel which is connected on the one side to the liquid device and which terminates on the other side in the first outflow opening, and a second channel which is connected on the one side to the liquid device and which terminates on the other side in the second outflow opening, while the apparatus is designed to supply, under control of the control means, in a settable manner with the aid of the liquid device, the fluid to the first a channel and/or to the second channel. Preferably, it holds that the system is designed to set the temperature of the fluid, under control of the control means, at wish from a plurality of setting possibilities. In this manner, on the one side, for instance a cold lemonade can be prepared, preferably without froth and, on the other side, a cup of hot coffee can be prepared, optionally with froth.

It further holds that the system is designed to set, under control of the control means, at wish from a plurality of setting possibilities, the amount of fluid which is dispensed for preparing a portion of the ready beverage. What can be achieved as a result thereof is, for instance, that the lemonade has a predetermined strong or less strong taste. All this holds completely analogously for, for instance, coffee.

In particular, it further holds that the holder is provided with a code and the apparatus with a code reader connected to the control means for reading the code of the holder, while the control means are designed for providing at least one of the settings mentioned on the basis of the read out code. Thus, in a predetermined manner, the characteristic properties of the beverage can be set. If the holder is filled with, for instance, a coffee concentrate which is optimally suited for preparing café crema, the code of the holder can contain information for the benefit of the apparatus so that the apparatus can set the apparatus optimally for preparing the café crema. If, however, the holder is filled with, for instance, a concentrate for lemonade where it is not desired to obtain froth and where the beverage is intended to be cold, the code can contain information which is read by the apparatus so that the apparatus is set such that a lemonade is prepared without froth and which, moreover, is cold. The code can also be determinative of setting the amount of fluid which is dispensed for preparing a portion of the ready beverage. Consequently, the strength of the flavour of the beverage is set. The advantage is that the user who inserts a particular holder into the apparatus, needs not concern himself about the further settings of the apparatus. The apparatus is set such that the ready beverage has the characteristic properties for the user.

In particular, it holds that the holder is punctured with the aid of the probe. However, this is not required. It is also conceivable, for that matter, that the apparatus is further provided with a movable element for puncturing the holder under control of the control means before the probe can be inserted through the first side of the holder. According to a highly advanced embodiment, it holds that the receiving space and the holder are geared to each other such that the holder can be received in the receiving space on at least one predetermined position. The advantage thereof is that a user cannot make a mistake when positioning the holder in the apparatus. Consequently, the cooperation between apparatus and holder is always optimal. More particularly, it holds here that the wall of the holder is provided with a holder recess and/or a holder projection and a wall of the receiving space is provided with a receiving space projection reaching into the holder recess and/or a receiving space recess with the holder projection reaching into the receiving space recess. It further holds in particular that an upper side of the receiving space abuts virtually completely against the first side of the holder. Preferably, it holds here that the apparatus is provided with a switch that is energized by the first side of the holder. Here, it is then preferred that the control means are connected to the switch while the control means ensure that the liquid device is not activated when the switch is not energized. This entails that a holder, or a wrong holder not belonging to the system, is incorrectly placed into the apparatus while the switch is not energized and no beverage can be prepared. If, conversely, this would be the case, the apparatus could, for instance, become damaged when the holder is punctured by means of the probe or the movable element.

The code of the holder can be provided at the holder in various manners. Here, for instance a barcode can be conceived, an electromagnetic identification label or perhaps a specific external form of the holder.

The invention furthermore relates to an apparatus of the above-mentioned system and a holder of the above-mentioned system.

The invention will presently be further elucidated on the basis of possible embodiments in the drawing. In the drawing:

FIG. 1b shows a top plan view of the holder of FIG. 1a in the direction of the arrow R of FIG. 1a;

FIG. 1c shows a possible bottom view of the holder of FIG. 1a in the direction of the arrow T of FIG. 1a;

FIG. 1d shows an alternative possible bottom view of the holder of FIG. 1a in the direction of the arrow T of FIG. 1a;

FIG. 2a shows a cross-section of a holder which is placed in a receiving space of an apparatus according to the invention;

FIG. 2b shows a side view of the receiving space and the holder according to FIG. 2a in the direction of the arrow Z of FIG. 2a;

FIG. 2c shows a cross section of the holder and the receiving space of the system according to the invention;

FIG. 2d shows a bottom view of the holder and the receiving space of FIG. 2a in a direction of the arrow O of FIG. 2a;

FIG. 3g shows an alternative embodiment of the system according to FIG. 3a.

Figure 3A:
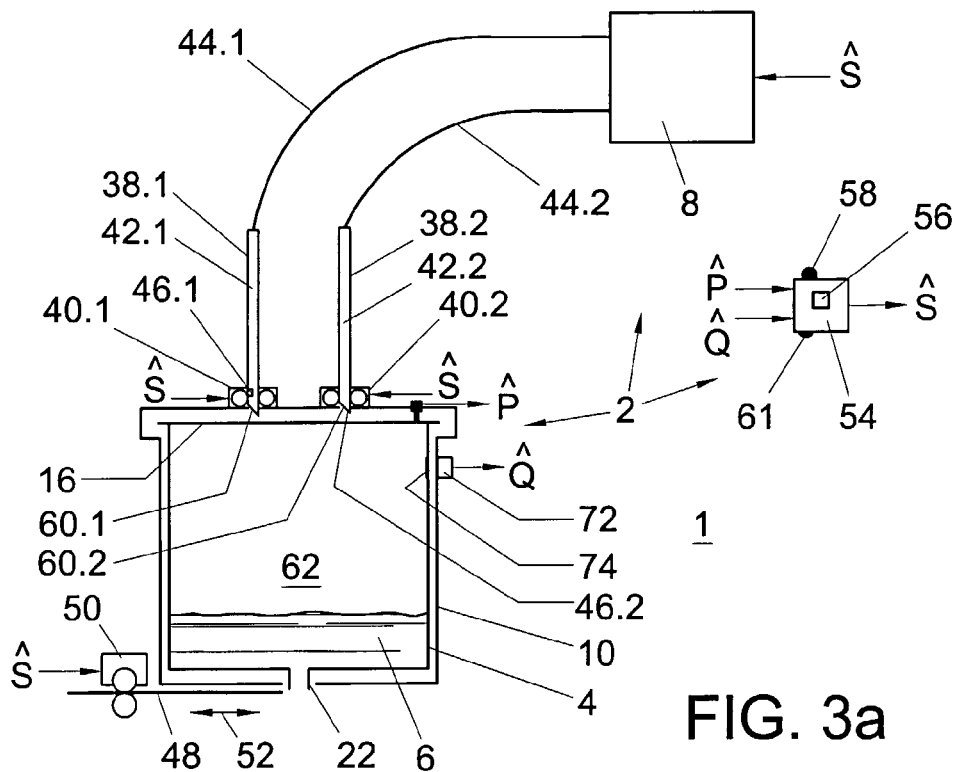
FIG. 3a is a possible embodiment of a system according to the invention which is provided with a receiving space and a holder according to FIGS. 1 and 2.

In FIG. 3a, reference numeral 1 indicates a possible embodiment of the system for preparing portions of a beverage suitable for consumption according to the invention. The system comprises an apparatus 2 for preparing the beverage and a closed holder 4 removably received in the apparatus, which holder is at least filled with a product 6 to be dissolved and/or to be diluted such as a concentrate. The apparatus 2 is provided with a liquid device 8 for dispensing fluid under pressure. In this example, the fluid involved is water. Here, the liquid device can consist of an apparatus known per se comprising, for instance, a boiler and a pump for dispensing hot water under pressure. The boiler may also be designed such that it is also possible to vary the temperature of the boiler for dispensing hot water, tepid water, et cetera.

Figure 1A:
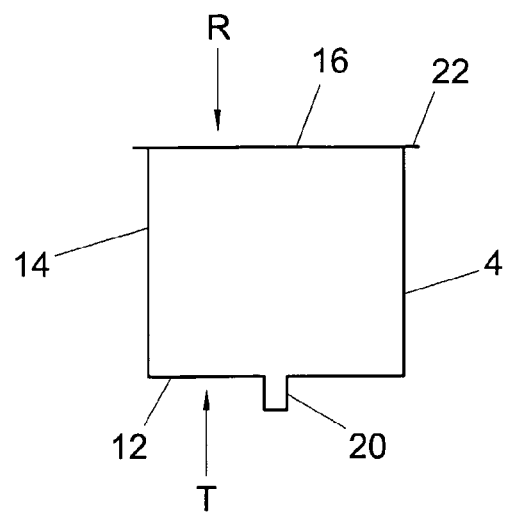
FIG. 1a shows a side view of a holder according to the invention.

The apparatus is further provided with a receiving space 10 in which the holder can be removably received. In the example, the holder 4 is provided with a form-retaining bottom 12 manufactured from plastic and with an upstanding sidewall 14 manufactured from the same form-retaining material (see FIG. 1a). In this example, an upper wall 16 of the holder is manufactured from a thin-walled plastic material in which weakened zones 18A and 18B are provided (to be further elucidated). Further, in this example, in the bottom 12, a deepened portion 20 is provided. Further, in this example, the holder is provided at its upper side with a continuous flange 22 (see FIG. 1a). Further, in this example, the holder is provided with a groove or recess 24 reaching from top to bottom.

As can be seen in FIG. 2a, the receiving space 10 is provided with a bottom 26 on which the holder 4 rests. The receiving space 10 is further provided with an upper wall 28 situated just above the upper wall 16 of the holder 4. In the bottom 26 of the receiving space 10, a slit 30 is provided which enables the holder to be slid into and from the receiving space 10. The receiving space is further provided with an upstanding sidewall 32 which, in this example, has the shape of a half cylinder extending through an angle of 180°, measured in the plane of the bottom 26 of the holder. The sidewall 32 is provided with a vertically extending protrusion 34 reaching into the groove 24 of the holder. The sidewall is further provided with a horizontal groove 36 extending through an angle of 180° in tangential direction of the upstanding sidewall 32 and in which the flange 22 of the holder is received. As the upstanding sidewall 32 extends in tangential direction through an angle of 180°, the cylindrical holder 4 can be slid into and from the receiving space 10. Here, the slit 30 provides space for the deepened portion 20 of the holder. As the flange 22, with the exception of the location of the groove 36, is wider than the inside diameter of the upstanding sidewall 32, the holder 10 cannot be received upside down in the receiving space. Further, the cooperation between the protrusion 34 and the groove 36 ensures that the holder, viewed in tangential direction of the holder, can only be slid into the receiving space 10 in one manner. All this entails that the holder 4 can only be received in the receiving space 10 in one manner. The position of the holder 4 within the receiving space 10 is thus defined.

The apparatus according to FIG. 3*a* is further provided with a first probe 38.1 and a second probe 38.2. Before the apparatus is used, the first and second probe 38.1 and 38.2 are situated just above the upper wall 16 of the holder 4. The apparatus 2 is further provided with a first drive 40.1 for moving the first probe 38.1 up and down, and a second drive 40.2 for moving the second probe 38.2 up and down. In this example, both the first probe 38.1 and the second probe 38.2 are needle-shaped. The first probe is provided with a channel 42.1 which, the one side, by means of a first tube 44.1, is in fluid communication with the liquid device 8 and which, on the other side, terminates in an outflow opening 46.1 situated adjacent the bottom side of the probe 38.1. The second probe 38.2 is also provided with a second channel 42.2 which, on the one side, is in fluid communication with the liquid device 8 by means of a second tube 44.2, and which terminates on the other side in an outflow opening 46.2

The system is further also provided with opening means for obtaining, in use, an outlet opening at the holder for dispensing a ready beverage. In this example it therefore holds that the outlet opening formed provides a free passage so that the beverage can flow from the holder under the influence of gravity when the outlet opening has been provided. In this example, the opening means are provided with a moveable knife 48 belonging to the apparatus, which, by means of a drive 50 of the apparatus, can be moved horizontally to and fro in the direction of the arrow 52. The apparatus is further provided with control means 54 which comprise, in this example, a microprocessor 56 for controlling the liquid device 8, the drives 40.1 and 40.2 and the drive 50.

The operation of the system according to FIG. 3*a* described up to this point is as follows.

For the purpose of preparing for instance coffee, a holder 4 is slid into the receiving space 10 in an unambiguous manner as set forth hereinabove on the basis of FIGS. 1, 2, and 3*a*. Then, a user energizes for instance a switch 58 of the control means 54 for activating the apparatus 2. Via a control signal $\hat{S}$, the control means cause the first drive 40.1 to move the first probe 38.1 downwards. A point 60.1 of the first probe, in this example designed to be sharp, touches the upper wall 16 at a location which is enclosed by the weakened zone 18A. As a result of the force exerted in downward direction by the probe 38.1 on this area of upper wall 16, the upper wall 16 will tear at the location of the weakened zone 18A whereupon this part is folded inward and the probe is received, at least partly, in an inside space 62 of the holder 4. In this example, the control means 54 are further provided which schematically indicated input means 61 with which a user can indicate that he wants to prepare a beverage with froth. The result thereof is that via the control signal $\hat{S}$, the control means 54 also activate the second drive 40.2 for moving the second probe 38.2 downwards. The second probe will touch the upper wall 16 with its point 60.2 at a position which is enclosed by the second weakened zone 18B which will then tear open after which the second probe 38.2 too will reach into the inside space 62 of the holder 4.

Figure 3B:
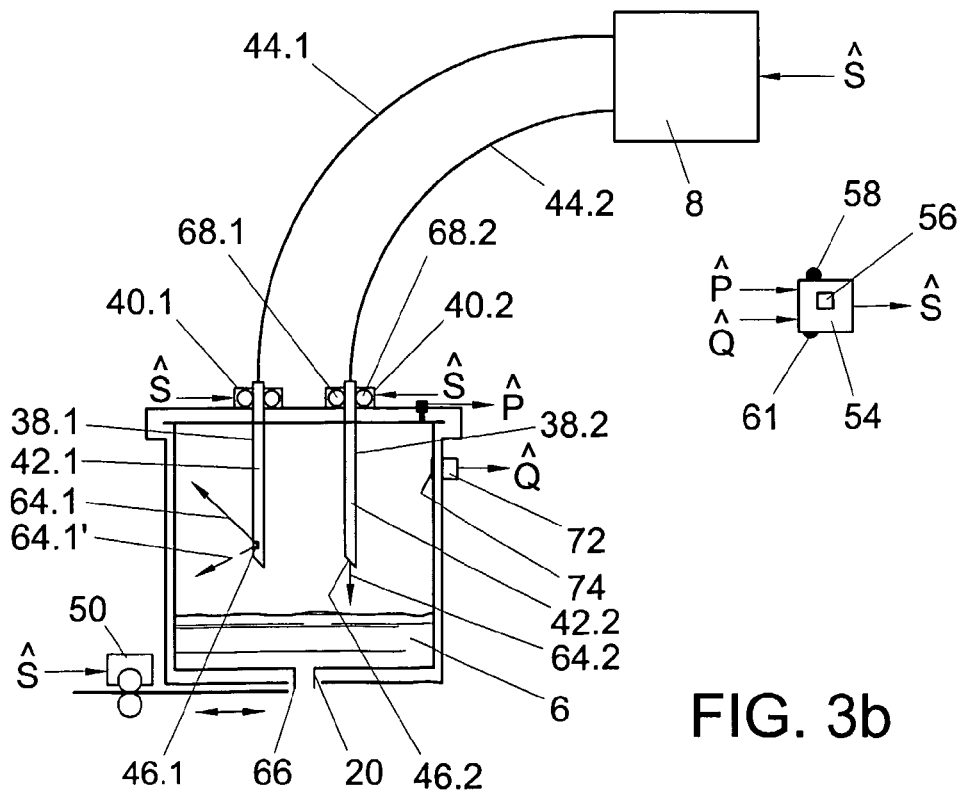
FIG. 3b shows the system according to FIG. 3a in use.

Then, the control means will activate the liquid device 8 by means of the control signal $\hat{S}$ in order that the liquid device 8 will start supplying hot water under pressure to the tube 44.1 and the tube 44.2. This situation is shown in FIG. 3*b*. In the example, the outflow opening 46.1 is provided at a side of the probe 38.1. The result is that via the outflow opening 46.1 a jet of water 64.1 is dispensed in an obliquely upward direction. This jet of water will strike the inside of the upstanding sidewall of the holder to then, depending on the force of the water jet, be reflected by the inside of the upstanding sidewall and then flow downwards in the holder so that the hot water will start to mix with the concentrate 6. By contrast, at the second probe 38.2, the outflow opening 46.2 is provided such that a jet of water 64.2 is generated which is directed downwards. The result is that this jet 64.2 will strike on the concentrate and any water in which the concentrate may have already (partly) dissolved and which is present on the bottom 12 of the holder. Consequently, air will be beaten into the beverage to be prepared. This air may for instance be the air which was already present in the holder or air flowing into the holder via the openings provided by the probes in the upper wall. It is also possible that the fluid which is supplied through the first and/or second probe also comprises a gas such as air for obtaining froth. For instance, just after the control means 54 have activated the liquid device 8, the control means 54 will activate the drive 50 by means of the control signal $\hat{S}$, resulting in that the small knife 48 is moved from the position as shown in FIG. 3*a* to the right in the direction of the arrow 52. As a result, a part of the deepened portion 20 will be cut off. Then, under control of the control means 52, the drive 50 is driven such that the knife returns to it original position. The situation which then applies is shown in FIG. 3*b*. Presently, the remaining part of the deepened portion 20 forms an outlet opening 66 of the holder. The result is that the ready beverage is dispensed from the holder under the influence of gravity and can be collected in a cup placed thereunder. When the provision of the outlet opening 66 is carried out at a moment that, in this example, a relatively large part of the beverage to be prepared has already been prepared and is present in the holder 4, a suitable amount of froth will already have formed and the largest part of the concentrate will already have been diluted homogeneously. When the provision of the outlet opening is carried out earlier, the outflow from the holder will start sooner so that the jet of the second probe strikes on a lower level of the beverage so that less froth can be beaten in. Some time after the outlet opening 66 has been formed, the control means 54 will deactivate the liquid device 8 so that no more hot water is supplied to the first and second probes. Then, the holder 4 can drain completely whereupon the process is terminated. After this, the control means 54 will activate the drives 40.1 and 40.2 in order that the first and second probes are moved back again, upwards in their original position as shown in FIG. 3a. Then, the holder can be taken from the receiving space of the apparatus and be thrown away. The apparatus is now ready to receive a new holder which is filled with, for instance, a concentrate for preparing lemonade. If lemonade is to be prepared, the control means 54 can for instance use only the first probe 38.1 for supplying water to the holder. In that case, the control means 54 will furthermore ensure that with the aid of the liquid device 8, unheated water is dispensed, in this example more specifically only to the tube 44.1. What it amounts to is that, in this example, for preparing lemonade, the first probe 38.1 is moved downwards until it reaches into the holder while the second probe 38.2 remains at a position as shown in FIG. 3a. The second probe is then situated in a position as shown in FIG. 3b. Then, with the aid of the liquid device 8, cold water is supplied to the tube 44.1 for preparing the lemonade. However, providing the outlet opening 66 is carried out completely analogously to what is described hereinabove concerning coffee. The fact that lemonade is to be prepared can, once more, be inputted by a user by means of the input means 61 at the control means 54. If, conversely, it is intended that much froth is formed, this can also be inputted at the control means 54. The control means 54 can then for instance provide that for the preparation of, for instance, coffee only the second probe 38.2 is used. The first probe 38.1 then remains in the position shown in FIG. 3a while the second probe 38.2 is manipulated to the position shown in FIG. 3b, where now, under control of by the control means 54, only hot water is supplied to the tube 44.2 with the aid of the liquid device. This results in that all the water that is supplied to the holder spouts in downward direction. Therefore, all this water will be used for obtaining froth so that relatively much froth is generated, at least more froth than when the total amount for preparing a portion of ready beverage is supplied to the holder divided over the two probes 38.1 and 38.2. Such variants are each understood to fall within the framework of the invention. In this example, the first jet is directed obliquely upwards. However, the first jet can also have a downward sloping direction. In both cases in this example, the first jet is directed towards a sidewall of the holder with the first jet striking the sidewall. The first jet can also have a direction obliquely upwards such that it strikes the top wall 16. In this example, the second jet is directed towards the bottom so that in use, it strikes the product. Preferably, it holds that the second jet is directed at least virtually vertically downwards and that the first jet comprises a speed component in horizontal direction towards the sidewall and a speed component in vertical direction to the bottom. The direction of such a first jet is shown in dotted lines in FIG. 2b and indicated with reference numeral 64.1'.

As, after use, the form-retaining holder can be replaced with a new holder, contamination can be prevented. This holds in particular when, in use, the at least one probe does not directly contact the product, i.e. does not reach into the product.

Figure 3C:
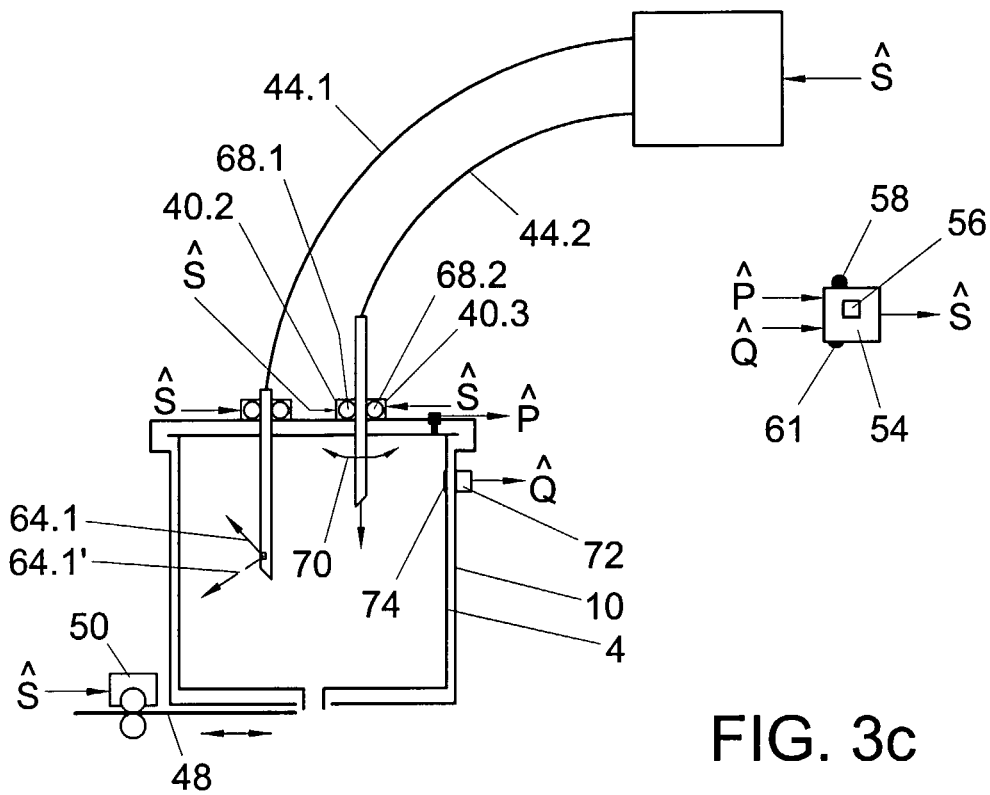
FIG. 3c shows the system according to FIG. 3a in use.

By contrast, it is further possible, as indicated in FIG. 3c, that for instance the second probe 38.2, in use, is not slid downwards over its entire length. Conversely, in the situation shown in FIG. 3b, this is the case. In the situation shown in FIG. 3b, this entails that when the holder is slowly filled with the ready beverage, sooner or later, the ready beverage will have reached the level of the outflow opening 46.2. As a result thereof, the jet will no longer strike on a fluid surface of the ready beverage so that no more air is beaten in. However, if, in use, the second probe 38.2 is at a higher level, i.e. at a different position than shown in FIG. 3b, more air will be beaten in because it takes longer before the liquid level in the holder reaches the second outflow opening 46.2. Moreover, it may be so that the liquid level does not reach this at all when the outlet opening 66 is formed relatively early and the holder starts to drain. It is also possible, in addition to the height of the second probe 38, to also set the orientation of the second probe 38.2. In this example, as shown in FIG. 3c, the probe 38.2 is clamped on two sides by two wheels 68.1 and 68.2. Each wheel can be moved separately by means of a second drive 44.2 and a third drive 44.3. For movement in downward direction, the wheels 68.1 and 68.2 are driven in the opposite direction. When the probe has reached, for instance, the position as shown in FIG. 3c, the probe can be tilted according to the direction of the arrow 70 in FIG. 3c by moving the wheels in the same direction, or stopping one of the wheels and moving the other wheel. Evidently, all this is once more carried out by the control means 54 by means of the control signal Ŝ. By thus varying the direction of the probe and the height, once more, characteristic properties of the beverage, such as the amount of froth which is beaten in, can be modified.

Figure 3D:
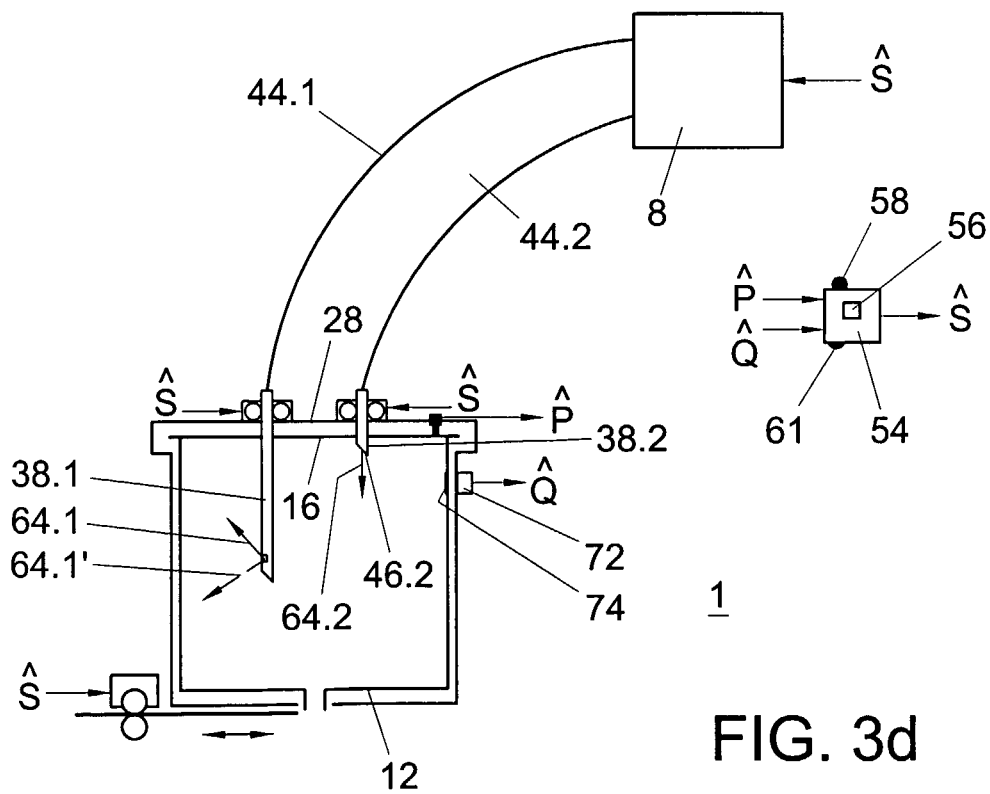
FIG. 3d shows an alternative embodiment of the system according to FIG. 3a in use.

In FIG. 3d, an embodiment of a system is shown which, to a large extent, corresponds to the system according to FIG. 3a. One difference with the system according to FIG. 3a is that with the system according to FIG. 3d, the second probe 38.2 is of relatively short design. As the upper side of the receiving space, in this example the upper wall 28, virtually abuts against a first side of the holder, as is also the case in FIG. 1, which first side is manufactured such that it can be punctured, in this example the upper side 16 of the holder 4 with the weakened zones 18A and 18B is involved, it holds that, in use, the outflow opening 46.2 of the second probe 38.2 is situated to both first sides (the upper wall 28) of the holder 4. In this manner, in this example, the jet 64.2 can be formed in downward direction from a position which lies at a maximum distance from a bottom 12 of the holder 4.

Figure 3E:
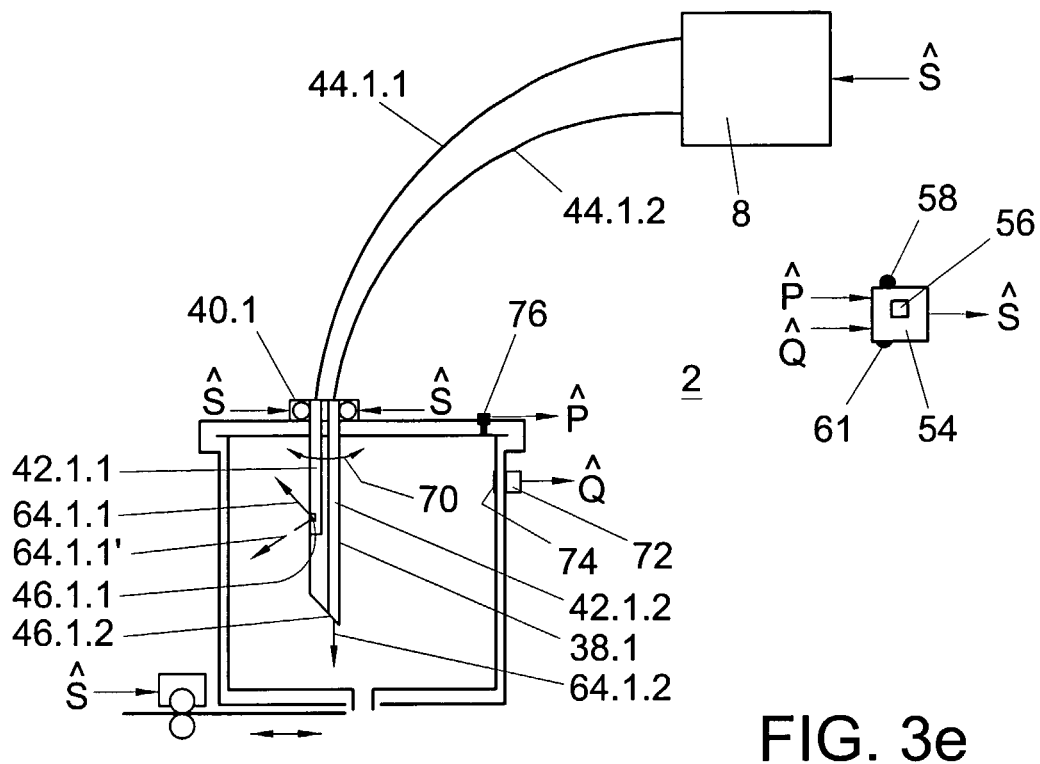
FIG. 3e shows an alternative embodiment of the Figure of the system according to FIG. 3a in use.

In FIG. 3e, an embodiment is shown of an apparatus 2 which is provided with a holder 4 as described with reference to FIGS. 3a-3c. Presently, contrary to the apparatus of FIG. 3a, the apparatus 2 is provided with only one probe 38.1 which can be moved upwards and downwards by means of the drive 40.1 as discussed in relation to the probe 38.1 of FIG. 3a. In this example, the probe 38.1 is provided with a first channel 42.1.1 which is connected on the one side to the liquid device 8 by means of a tube 44.1.1 and which terminates on the other side in a first outflow opening 46.1.1 of the probe 38.1. The probe 38.1 is further provided with a second channel 42.1.1 which, on the one side, is in fluid communication with the liquid device 8 by means of a hose 44.1.2, and, on the other side, terminates in a second outflow opening 46.1.2.

The apparatus is designed to supply fluid, under the control of the controlling means 54, in a settable manner with the aid of the liquid device 8, to the first channel and/or to the second channel. When the fluid is supplied by means of the tube 44.1.1 to the first channel 42.1.1, a jet 64.1.1 is generated which, again, is directed obliquely upward. When water is supplied under pressure to the second tube 44.1.2, from the outflow opening 46.1.2, a second jet 64.1.1 is generated which is directed downwards. Thus, at will, an upward directed jet or a downward directed jet can be generated for setting characteristic properties of the beverage. Evidently, here, also the height of the probe 38.1 can be set as discussed in relation to FIG. 3c for the second probe 38.2 and, furthermore, the orientation of the probe can be set according to the direction of the arrow 70 as also discussed for the probe 38.2 with reference to FIG. 3c.

For each of the embodiments outlined here, it holds that the holder can further be provided with a code and the apparatus with a code reader 72 connected to the control device for reading the code of the holder. In this example, the holder 4 is for instance provided with an electromagnetic responder known per se in which a readable code is stored. The code reader 72 generates an electromagnetic interrogation field while the electromagnetic responder 74 of the holder reacts when it is brought into the interrogation field by transmitting the code stored in the responder 74. The thus read code is supplied to the control means 54 by means of a signal QA. On the basis of this code, the control means can automatically determine and apply the above-discussed settings. For instance, on the basis of the code, the temperature of the water dispensed by the liquid device 8 can be determined and set. It can also be determined which of the probes 38.1 and 38.2 will be used for dispensing water to the holder. Therefore, the code can determine that either the probe 38.1 or the probe 38.2, or both probes 38.1 and 38.2 move downwards. In addition, the code can determine whether water is supplied to the tube 44.1 or to the tube 44.2, or to both tubes 44.1 and 44.2. This holds for the embodiments discussed with reference to FIGS. 3a-3d. The code can also determine how much water is supplied to the holder for the preparation of a portion of the beverage. Furthermore, it can be determined how much water per probe 38.1 and 38.2 is supplied to the holder on the basis of the code. Also, on the basis of the code, the orientation of the probe 38.2 in the direction of the arrow 70 can be determined.

Also the flow rate of the jet 64.1 or of the jet 64.2 can be determined by the code. The same holds for the flow velocity of the jets 64.1 and 64.2. All this can be set by means of the code. Naturally, it is not excluded that all this is also inputted manually at the control means 54. Therefore, the apparatus is provided with control means while the apparatus is further designed to set, under control of the control means, the direction of the at least one jet, the position of the at least one jet, the flow rate of the at least one jet, the flow velocity of the at least one jet and/or the number of jets in a predetermined manner, for in advance setting the characteristic properties of the ready beverage, such as, for instance, the amount of froth that is obtained with the ready beverage through impact of the jet on an inside of the holder and/or on the product and/or on the fluid previously supplied to the holder.

With the system according to FIG. 3e, completely analogously, a code can be read out which determines the possible settings mentioned there such as whether the jet 64.1.1 or the jet 64.1.2, or both jets 64.1.1 and 64.1.2 is or are generated. The code can also determine the direction of the jet. The code can also determine the height at which the probe 38.1 must be and which orientation the probe should then assume (the direction of the probe 38.1 can be set as discussed for the probe 38.2 in FIG. 3c). To put it briefly, the position of the probe 38.1 within the holder can be determined by the code. This also holds for the flow rate and the flow velocity of the respective jets as discussed hereinabove.

Therefore, the code can be determinative of the setting of the amount of froth of the ready beverage. The code can also be determinative of the setting of the amount of fluid which is dispensed for preparing a portion of the ready beverage. The code can further be determinative of the setting the temperature of the fluid. Such possibilities each fall within the framework of the invention. In each of the embodiments outlined hereinabove, it furthermore holds that the code can be determinative of the moment at which the liquid device 8 starts dispensing water under pressure and the moment at which the drive 50 is activated for providing the outlet opening 66 with the aid of the knife 48.

It further holds in each of the embodiments outlined hereinabove that the apparatus is further provided with a switch 76 which is energized when a holder 4 is slid into the receiving space 10. In this example, the holder is energized by said first side, i.e. by the upper wall 16 of the holder. When the switch is energized, this is transmitted to the control means 54 by means of the switch signal $\hat{P}$. The control means 54 therefore detect an energizing of the switch 76. If the switch 76 is not energized, in this example, the control means 54 will ensure that the liquid device 8 and the drives 40.1, 40.2 and 50 are not activated. The fact is that in that case, no holder is received in the receiving space, or a holder that does not fit. The holder may, for that matter, be to narrow or not high enough.

Figure 3F:
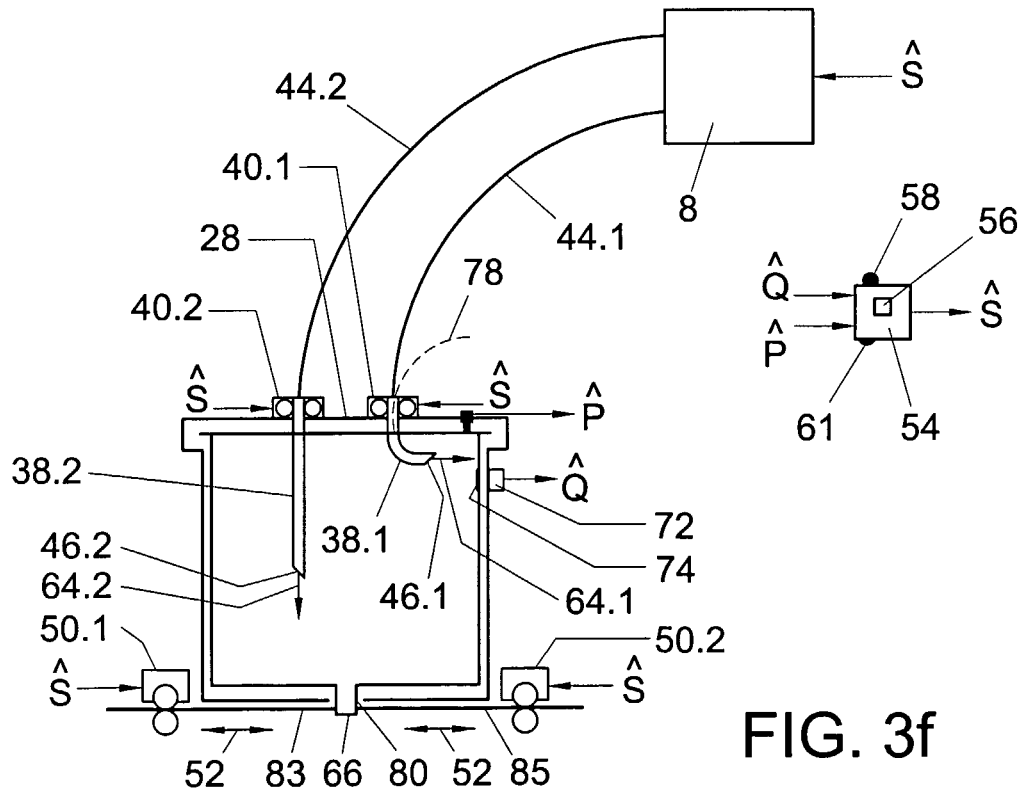
FIG. 3f shows an alternative embodiment of the system according to FIG. 3a in use.

Presently, on the basis of FIG. 3f, a system is described which corresponds to a large extent to the system according to FIG. 3a. Only the differences will be indicated further. In the apparatus according to FIG. 3f, the probe 38.1 is of curved design. Consequently, when the drive 40.1 is driven, the probe will travel a path along a segment of a circle. In FIG. 3f, this segment of a circle is indicated in a dotted line with reference numeral 78. The result is that when the probe 38.1 is inserted into the holder, as shown in FIG. 3f where the outflow opening 46.1 is provided at the free end of the probe 38.1, a jet 64.1 in horizontal direction is generated. In this example, the probe 38.2 is designed such that by means of an outflow opening 46.2 provided at the free end of the probe 38.2, a vertically downward directed jet 64.2 is generated.

Figure 1B:
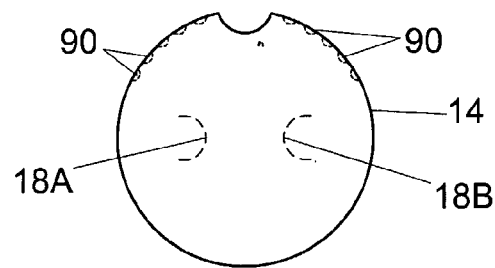
Figure 1C:
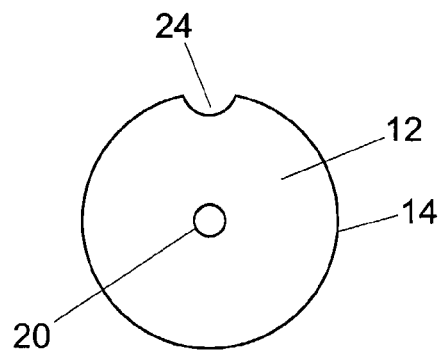
Figure 1D:
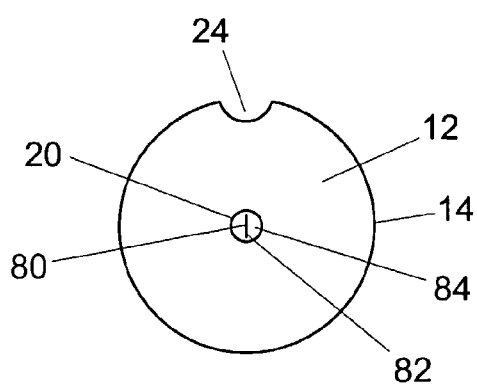

The holder of FIG. 3f is further provided with a slightly modified deepened portion 20. The holder is provided with a valve 80, the apparatus being further provided with energizing means 50.1, 50.2, 82, 84 for opening the valve under control of the control means 54, for obtaining the outlet opening in the holder. It this example, the valve is designed as a valve which is normally closed, which closes again when the energizing means are deactivated. With this, dripping is prevented when the beverage has been prepared and the holder has at least virtually drained. In this example, the deepened portion 20 is provided with a duck-valve 80 known per se. A bottom view of such a holder with such a duck-valve 80 is shown in FIG. 1d. The duck-valve consists of a cut 82 provided in a bottom 84 of the deepened portion. In FIG. 3f, this cut extends in the plane of the drawing. The apparatus of FIG. 3f is further provided with a first element 83 which can be moved to and fro in the direction of the arrow 52 by means of drive 50.1. The apparatus further comprises a second element 85 which can be moved to and fro in the direction of the arrow 52 by means of the drive 50.2. When the holder 4 has been placed in the receiving space as described on the basis of the preceding Figures, and when the outlet opening 66 is to be formed, the control means 54 ensure that the elements 83 and 85 are moved together with the aid of the drives 50.1 and 50.2. As a result thereof, the deepened portion 20 which is manufactured from flexible material will start to deform such that the cut 82 starts to open. The fact is that the material on both sides of the cut—at least in the middle of the cut—is moved apart. As a result, the outlet opening 66 is formed and the holder 43 can drain as described with reference to FIGS. 3a-3c.

Then, by means of the drives 50.1, 50.2, the control means 54 cause the elements 83, 85 to be moved apart so that the duck-valve 80 will close again. In this manner, dripping is prevented.

Further, is holds that instead of, or in addition to an electromagnetic responder 74, the code can also be provided in the holder in a different manner. For instance, the code of the holder can be formed by a specific external form of the holder while the code reader 86 of the apparatus is designed to recognize this external form. A possible example hereof is outlined on the basis of FIG. 1b. As can be seen in FIG. 1b, the edge 22 may be provided with a number of notches 90 which may or may not have been provided. In this example, ten notches may or may not have been provided. With this, it is therefore possible to provide 210, that is to say 1096 different codes. Here, as shown in the example of FIG. 2c, the apparatus can be provided with a plurality of ten proximity switches 92, each proximity switch being used to determine whether on the respective position where a notch 90 may have been formed a notch has actually been formed. As the bulge 34 is received in the groove 36, it is ensured that the proximity switches 92 and the optional notches 90 lie diametrically opposite each other. Each of the proximity switches is connected to the control means 54 so that the control means 54 can determine the respective code on the basis notches 90, detected or not detected by the proximity switches 92. On the basis of the code, the settings mentioned as described hereinabove can be applied with the apparatus.

All these variants are understood to fall within the framework of the invention. With the systems according to FIGS. 3a-3f, it may for instance hold that the first jet 64.1 and the second jet 64.2 have mutually different directions. In particular, it holds that the first jet is directed towards the sidewall 14 of the holder and strikes the sidewall, and that the second jet is directed towards the bottom 12 and, in use, directly strikes the product 6. It also holds in particular that the second jet is directed downwards at least virtually vertically and that the first jet comprises a speed component in horizontal direction towards the sidewall and a velocity component in vertical direction towards the bottom.

Figure 3G:
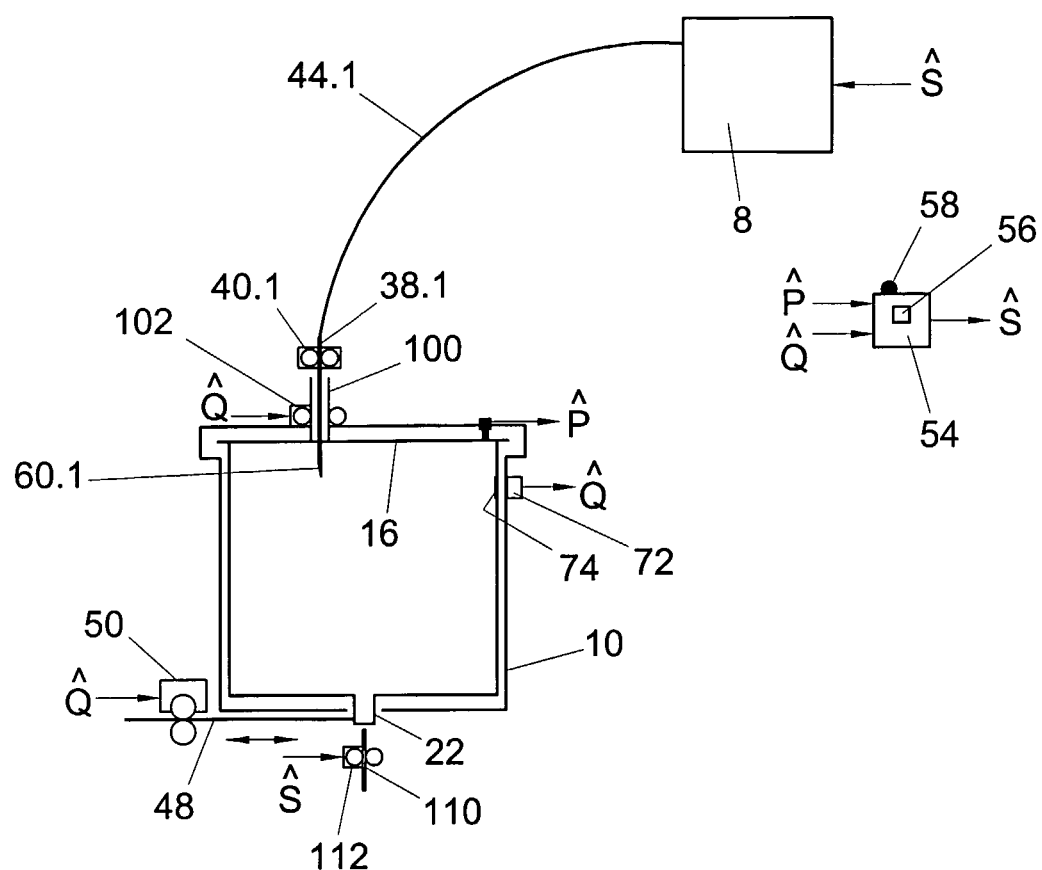

The invention is not limited in any manner to the above-outlined embodiments. For instance, the holder and/or the receiving wall can also assume other shapes. It is also possible that the upper wall 16 of the holder is not formed from plastic but is manufactured from, for instance, a thin-walled metal material. In that example, the weakened zones 18A 18B mentioned may be omitted because there, the probes can easily puncture the respective material. What is more, the weakened zones 18A and 18B can also be omitted with the apparatuses outlined hereinabove when the upper wall 16 is manufactured from plastic. Then, it is of importance that the point of the probes is designed sufficiently sharp and that the upper wall 16 is sufficiently thin-walled. In the embodiments outlined hereinabove, the upper wall 16 is punctured by means of the probes themselves. Naturally, it is also possible that another element than the probes 38.1 and 38.2 puncture the upper wall 16. For instance, the apparatus may be provided with a movable element, in the example of FIG. 3g an outside tube 100, for puncturing the holder, under control of the control means 54, before the probe 38.1 can be pierced through the first side of the holder. In this example, the outside tube 100 is driven with the aid of a drive 102. By means of the first drive 40.1, the probe 38.1 is moved up and downwards when the outside tube 100 has provided an opening thereto in the upper wall 16. The probe may be of a type as discussed in FIG. 3e. Also, two probes 38.1, 38.2 can be used which are each received in the outside tube 100 for puncturing the holder at two different positions. In the exemplary embodiment outlined hereinabove, the control means 54 are of electronic design and are provided with a microprocessor 56. However, it is also conceivable that the control means are of mechanical design. If further holds with the apparatus according to FIGS. 3a-3d, and with the apparatus according to FIG. 3f that the apparatus is provided with cutting means for providing, under control of the control means 54, the outlet opening in the holder. However, it is also conceivable that the opening means in the form of piercing means are used for providing the opening. These piercing means can for instance consist of a pin 110 which is moved in vertical direction with the aid of a drive 112 for piercing an opening in the deepened portion 20 to then be moved back downwards to release the thus formed outlet opening, all this under control of the control means 54 (see FIG. 3g). With each of the above outlined variants, it is also conceivable that instead of water, a different liquid such as milk is dispensed by the liquid device 8. The liquid device may also dispense a gas, such as air, oxygen, nitrogen, carbonic acid and the like.

It is also conceivable that the outflow openings of the desired probe are provided with valves which, for instance under control of the control means, can be (completely or partly) opened and closed. These valves can also be provided in, for instance, one or more of the channels of the probe or in one or more of the tubes connected to the probes. Such variants are each understood to fall within the framework of the invention.

The invention claimed is:

1. A system for preparing portions of a beverage suitable for consumption, the system comprising:
   an apparatus for preparing the beverage, and
   a closed and form-retaining holder removably received in the apparatus, which holder is at least filled with a product to be dissolved and/or to be diluted,
   the apparatus being provided with:
      a liquid device for dispensing a fluid under pressure, comprising at least one liquid or at least one liquid and a gas,
      a receiving space in which the holder is received, and
      at least one probe provided with at least one channel which, on the one side, is in fluid communication with the liquid device and which, on the other side, terminates in a first outflow opening of the probe,
   one wall of the holder being manufactured from a fluid-tight material while, on a first side of the holder, the wall is manufactured such that it can be punctured,
   the apparatus being designed for puncturing the wall on the first side and for moving the probe and the holder relative to each other so that in use, the probe can pierce through the first side of the holder, whereupon the first outflow opening reaches into the holder,
   opening means for obtaining, in use, an outlet opening at the holder for dispensing the ready beverage while, in use, the fluid is supplied by the liquid device to the at least one channel for generating at least one jet of the fluid from the first outflow opening of the probe in the holder for dissolving and/or diluting the product whereupon the ready beverage flows from the at least one outlet opening,
   wherein the apparatus is provided with control means, while the apparatus is configured to set, under control of the control means, at least one setting of the jet in a predetermined manner, as desired from a plurality of setting possibilities for determining, in advance, characteristic properties of the ready beverage, the at least one setting of the jet comprising the direction of the at least one jet, the position of the at least one jet, the flow rate of the at least one jet, the flow velocity of the at least one jet and/or the number of the jets;

wherein the apparatus is configured to set, under control of the control means, the vertical position of the probe within the holder and the angle of the probe with respect to the holder from a plurality of setting possibilities, for setting the direction of the at least one jet in the predetermined manner;

wherein the probe is provided with a second outflow opening, while the apparatus is designed to generate, under control of the control means, in a settable manner, with the aid of the first outflow opening, a first jet of the fluid in the holder and to generate, with the aid of the second outflow opening a second jet of the fluid; and wherein the probe is designed to close off or release, under the control of the control means, the first outflow opening in a settable manner and to close off or release the second outflow opening in a settable manner.

2. The system according to claim 1, wherein the at least one channel of the probe consists of two channels, a first channel and a second channel, wherein the first channel is connected on the one side to the liquid device and terminates on the other side in the first outflow opening and the second channel is connected on the one side to the liquid device and terminates on the other side in the second outflow opening, while the apparatus is designed to supply, under control of the control means, in a settable manner, with the aid of the liquid device, the fluid to the first channel and/or the second channel.

3. The system according to claim 1, wherein the system is designed to set the temperature of the fluid, under control of the control means, at wish from a plurality of setting possibilities.

4. The system according to claim 3, wherein the system is designed to set, under control of the control means, the temperature of the fluid so that a warm, tepid or cold beverage is obtained.

5. The system according to claim 1, wherein the system is designed to set, under control of the control means, at wish from a plurality of setting possibilities, the amount of fluid which is dispensed for preparing a portion of the ready beverage.

6. The system according to claim 1, wherein the holder is provided with a code and the apparatus with a code reader connected to the control means for reading the code of the holder, while the control means are designed for providing at least one of said setting on the basis of the read-out code.

7. The system according to claim 6, wherein the code is determinative of the setting of the direction of the at least one jet, the position of the at least one jet, the flow rate of the at least one jet, the flow velocity of the at least one jet and/or the number of jets.

8. The system according to claim 6, wherein the code is determinative of the setting of the amount of froth with the ready beverage.

9. The system according to claim 6, wherein the code is determinative of the setting of the amount of fluid which is dispensed for preparing a portion of the ready beverage.

10. The system according to claim 6, wherein the code is determinative of the setting of the temperature of the fluid.

11. The system according to claim 1, wherein, in use, the holder is punctured with the aid of the probe.

12. The system according to claim 1, wherein the apparatus is further provided with a moveable element for puncturing the holder under control of the control means before the probe can be inserted through the first side of the holder.

13. The system according to claim 1, wherein the apparatus is provided with opening means comprising cutting or piercing means for cutting away or piercing, under control of the control means, a part of the holder for providing the outlet opening in the holder when the holder is located in the receiving space.

14. The system according to claim 6, wherein the control means activate the openings means for obtaining the outlet opening when, with the aid of the code reading means, the control means reads the code provided on the holder which corresponds to a set of settings stored in a control unit.

15. The system according to claim 1, wherein the receiving space and the holder are geared to each other such that the holder can be received in the receiving space on at least a predetermined position and preferably one predetermined position.

16. The system according to claim 15, wherein the wall of the holder is provided with a holder recess and/or a holder projection and a wall of the receiving space is provided with a receiving space projection reaching into the holder recess and/or a receiving space recess while the holder projection reaches into the receiving space recess.

17. The system according to claim 1, wherein an upper side of the receiving space abuts virtually completely against the first side of the holder.

18. The system according to claim 17, wherein the apparatus is provided with a switch which is energized by the first side of the holder.

19. The system according to claim 18, wherein the control means are connected to the switch while the control means ensure that the liquid device is not activated when the switch is not energized.

20. The system according to claim 17, wherein, in use, the outflow opening of the probe is situated adjacent the first side in the holder.

21. The system according to claim 1, wherein the outlet opening is situated on a second side of the holder opposite the first side.

22. The system according to claim 6, wherein the code of the holder is formed by a specific external form of the holder while the code reader is designed for recognizing this external form.

23. The system according to claim 6, wherein the code of the holder is formed by an electromagnetic responder, while the code reader is designed for reading out the electromagnetic responder.

24. The system according to claim 1, the holder further comprising a valve controllably engageable with a first and a second valve actuation element for opening the valve, the valve comprised of a flexible and deformable material and having a sealed outlet cut;

wherein the first and the second valve actuation elements are configured to move laterally inward and squeeze the valve such that the valve deforms, causing the outlet cut to break and form an outlet opening.

25. The system according to claim 24, wherein, when the first and the second valve actuation elements move laterally outward, the valve is released and the outlet opening returns to a closed position.

26. The system according to claim 1, wherein the holder further comprising a duck-valve;

wherein when fluid is supplied to the holder by the liquid device, the duck-valve opens to form an outflow opening;

wherein when fluid is not supplied to the holder by the liquid device, the duck-valve closes.

27. The system according to claim 1, wherein that the control means are provided with a microprocessor.

28. The system according to claim 1, wherein the outlet opening formed provides a free passage so that the beverage can flow from the holder under the influence of gravity when the outlet opening has been provided.

29. The system according to claim 1, wherein under control of the control means, the at least one jet is directed towards a bottom of the holder or is directed towards a sidewall of the holder.

30. The system according to claim 1, wherein the first jet and the second jet have mutually different directions.

31. The system according to claim 30, wherein the first jet is directed towards a sidewall of the holder and strikes the sidewall and that the second jet is directed towards a bottom of the holder and, in use, directly strikes the product.

32. The system according to claim 30, wherein the second jet is directed downwards at least virtually vertically and that the first jet comprises a speed component in horizontal direction towards the sidewall and a speed component in vertical direction to the bottom.

33. The system according to claim 1, wherein the apparatus is further designed to set, in reaction to a control signal from the control means, the direction of the at least one jet, the position of the at least one jet, the flow rate of the at least one jet, the flow velocity of the at least one jet and/or the number of jets.

34. A system for preparing a beverage from a fluid and a product suitable for consumption by a user, the system comprising:
  an apparatus for preparing the beverage, the apparatus comprising:
    a liquid device for dispensing a fluid under pressure,
    a receiving space, and
    a probe having a channel in fluid communication with the liquid device, wherein the channel includes a first outflow opening and a second outflow opening, wherein the first and second outflow openings are configured to produce a jet of fluid for dissolving and/or diluting the product when provided with fluid from the liquid device,
  a holder removably received in the receiving space, wherein the holder is filled with a product to be dissolved and/or to be diluted, wherein the holder includes a first wall configured to be punctured by the probe, and a second wall;
  a movable knife configured to create an outlet opening in the second wall; and
  a processor configured to receive an input signal indicative of a desired characteristic of the beverage and, in response, providing an output signal indicative of at least one of a plurality of settings, wherein the settings include at least one of the direction of at least one of the jets, the position of at least one of the jets, the flow rate of at least one of the jets, the flow velocity of at least one of the jets, or the number of the jets;
  wherein, under the control of the processor, the probe pierces the first wall of the holder and is positioned with the first outflow opening within the holder and with the probe in a vertical position relative to the holder and positioned at an angle with respect to the holder to set the direction of the first jet, and the liquid device is activated to provide the first jet to produce the beverage; and
  wherein, under the control of the processor, the movable knife moves to create the outlet opening in the second wall to allow the beverage to flow from the outlet opening.

* * * * *